US012762906B2

(12) United States Patent
Sasaki et al.

(10) Patent No.: US 12,762,906 B2
(45) Date of Patent: Oct. 13, 2026

(54) BATTERY CONTROL DEVICE

(71) Applicant: Hitachi Astemo, Ltd., Hitachinaka (JP)

(72) Inventors: Tetsuya Sasaki, Hitachinaka (JP); Mutsumi Kikuchi, Hitachinaka (JP); Takanori Yamazoe, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 99 days.

(21) Appl. No.: 18/839,948

(22) PCT Filed: Mar. 4, 2022

(86) PCT No.: PCT/JP2022/009572
§ 371 (c)(1),
(2) Date: Aug. 20, 2024

(87) PCT Pub. No.: WO2023/166743
PCT Pub. Date: Sep. 7, 2023

(65) Prior Publication Data
US 2025/0166424 A1 May 22, 2025

(51) Int. Cl.
*G07C 5/00* (2006.01)
*H04L 67/12* (2022.01)
*G08B 21/18* (2006.01)

(52) U.S. Cl.
CPC .............. *G07C 5/008* (2013.01); *H04L 67/12* (2013.01); *G08B 21/182* (2013.01)

(58) Field of Classification Search
CPC ....... G07C 5/008; H04L 67/12; G08B 21/182; G01R 31/396; H01M 10/48; H02J 7/00
USPC .......................................................... 701/31.4
See application file for complete search history.

(56) References Cited

U.S. PATENT DOCUMENTS 10,101,400 B2 * 10/2018 Jang .......................... B60Q 9/00
2016/0268642 A1 * 9/2016 Yamazoe ............ H01M 10/425
2017/0351561 A1 12/2017 Yamazoe et al.
(Continued)

FOREIGN PATENT DOCUMENTS

EP 2451046 A2 5/2012
EP 3790229 A1 3/2021
JP 2012-103839 A 5/2012
(Continued)

OTHER PUBLICATIONS

International Search Report, PCT/JP2022/009572, Apr. 26, 2022, 4 pgs.

*Primary Examiner* — Muhammad Shafi
(74) *Attorney, Agent, or Firm* — Volpe Koenig

(57) ABSTRACT

Provided is a battery control device that includes a master device that monitors states of a plurality of battery cell groups provided in a vehicle; and a plurality of slave devices installed for each battery cell group, and configured to detect a state of each battery cell group and transmit the states of the battery cell groups to the master device; wherein the master device and the plurality of slave devices sequentially communicate in a time-division manner, and the slave device includes an abnormality detection unit that detects an abnormality in communication by monitoring communication between another slave device and the master device, and when the abnormality detection unit detects the abnormality in the communication, the slave device transmits information on the other slave device to the master device together with information on the slave device.

10 Claims, 6 Drawing Sheets

(56) References Cited

U.S. PATENT DOCUMENTS

| | | | | |
|---|---|---|---|---|
| 2020/0396688 | A1 | 12/2020 | Hong et al. | |
| 2021/0053444 | A1* | 2/2021 | Schmidt | G01R 31/396 |

FOREIGN PATENT DOCUMENTS

| | | | |
|---|---|---|---|
| JP | 2017108567 | * | 6/2017 |
| JP | 2020-205587 | A | 12/2020 |
| JP | 2021-018070 | A | 2/2021 |
| KR | 20160073109 | * | 6/2016 |
| WO | 2015/063945 | A1 | 5/2015 |
| WO | 2016/072002 | A1 | 7/2017 |
| WO | WO-2021145297 | * | 7/2021 |

* cited by examiner

BATTERY CONTROL DEVICE

TECHNICAL FIELD

The present invention relates to a battery control device.

BACKGROUND ART

A battery module used in an electric vehicle, a hybrid vehicle, or the like is provided by connecting a plurality of single battery cells such as a lithium ion battery in series or in series and parallel. The battery control device that controls the battery module monitors the state of each single battery cell and estimates the capacity of each single battery from the measurement result. As a result, the battery module is controlled to prevent overcharge and over-discharge. In this field, a wireless battery management system (BMS) is known which has advantages of reduced weight, reduced cost, and increased degree of freedom in in-vehicle layout.

The wireless battery control device includes a measurement device (hereinafter referred to as a slave device) that measures the state of the single battery, a control device (hereinafter referred to as a master device) that analyzes information from the slave device and controls the battery module, and wireless communication that connects them by communication.

The wireless communication in a vehicle is affected by disturbance due to electromagnetic waves generated from various high-current parts in the vehicle, wireless devices, noise from outside the vehicle, and the like. Therefore, since deterioration of communication quality occurs in wireless communication in a vehicle, a configuration corresponding to a case where communication cannot be performed is required.

As a background art of the present technical field, PTL 1 discloses a method in which, when data transmission fails in a wireless communication, transmission data is broadcasted (simultaneously transmitted) to another peripheral slave device, and the slave device that has received the broadcasted battery data transmits the battery data to the control unit.

CITATION LIST

Patent Literature

PTL 1: JP 2020-205587 A

SUMMARY OF INVENTION

Technical Problem

In PTL 1, when another slave device performs proxy transmission of a slave device that has failed in data transmission, there is a problem that it takes time to detect an abnormality in a communication period, in consideration of a stage of receiving a reaction of a slave device that has made a communication error and transmitting the information to the control unit in the next period. From the viewpoint of coping with the functional safety standard in the battery control device, it is required that the battery control device can return to the safe state within a certain period of time at the time of failure detection of the battery control device, but in the method of PTL 1, there is a problem that the simultaneity of proxy transmission under a communication trouble is lost and this cannot be coped with.

In view of this, an object of the present invention is to provide a battery control device capable of securing simultaneity of proxy transmission under a communication trouble.

Solution to Problem

A battery control device of the present invention includes a master device that monitors states of a plurality of battery cell groups provided in a vehicle; and a plurality of slave devices installed for each battery cell group, and configured to detect a state of each battery cell group and transmit the states of the battery cell groups to the master device, wherein the master device and the plurality of slave devices sequentially communicate in a time-division manner, and the slave device includes an abnormality detection unit that detects an abnormality in communication by monitoring communication between another slave device and the master device, and when the abnormality detection unit detects the abnormality in the communication, the slave device transmits information on the other slave device to the master device together with information on the slave device.

Advantageous Effects of Invention

According to the present invention, a battery control device capable of securing simultaneity of proxy transmission under a communication trouble can be provided.

Figure 1:
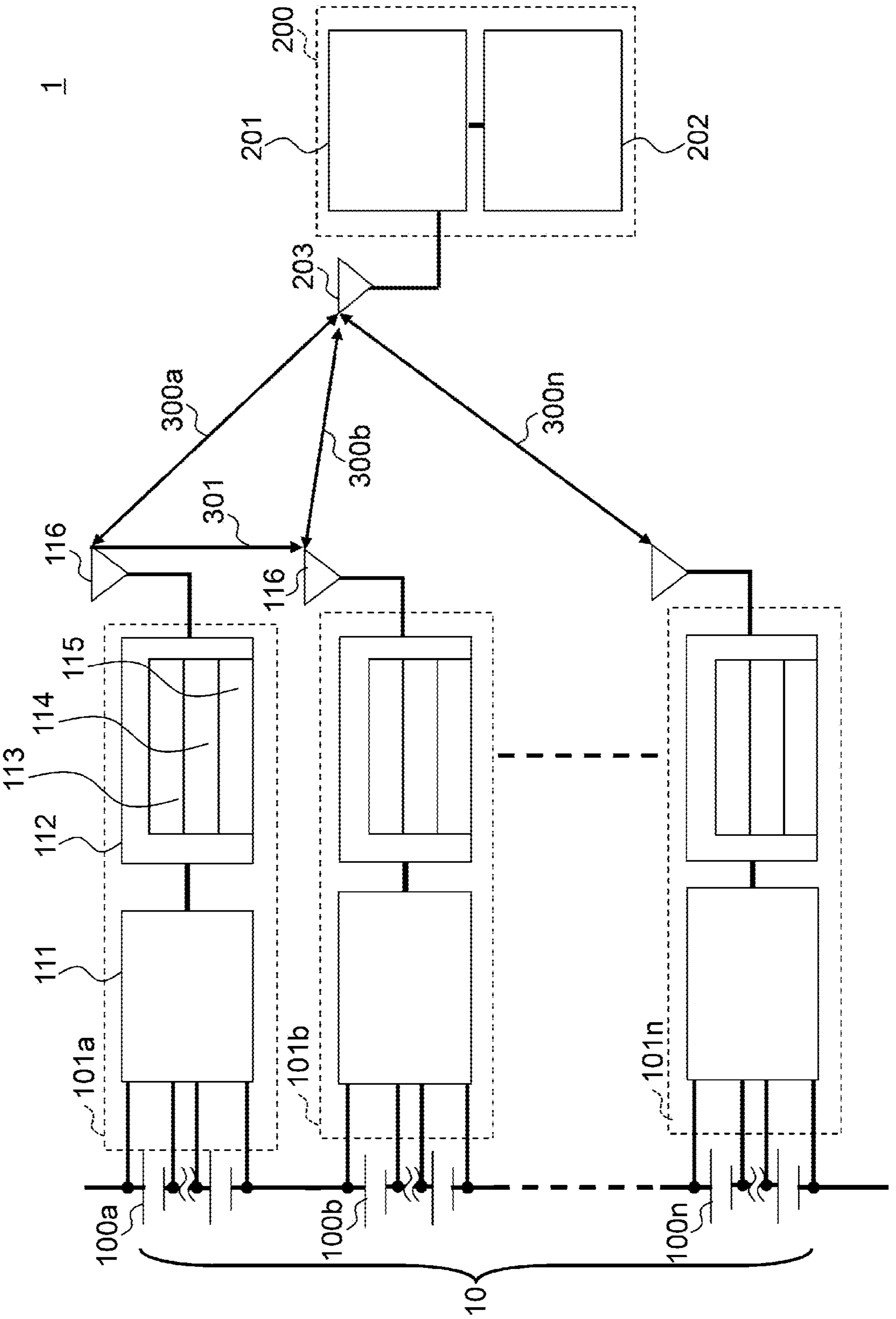
FIG. 1 is an overall configuration diagram of a battery control device according to one embodiment of the present invention.

Hereinafter, an embodiment of the present invention will be described with reference to the drawings. The following description and drawings are examples for describing the present invention, and are omitted and simplified as appropriate for the sake of clarity of description. The present invention can be carried out in various other forms. Unless otherwise specified, each component may be singular or plural.

Positions, sizes, shapes, ranges, and the like of the components illustrated in the drawings may not represent actual positions, sizes, shapes, ranges, and the like in order to facilitate understanding of the invention. Therefore, the present invention is not necessarily limited to the positions, sizes, shapes, ranges, and the like disclosed in the drawings.

ONE EMBODIMENT AND OVERALL CONFIGURATION OF THE PRESENT INVENTION

FIG. 1

In the battery control device 1 according to one embodiment of the present invention described below, description will be made assuming that a lithium ion battery having an operating voltage in a range of about 2.5 to 4.5 V is used as a power storage/discharge device which is a minimum unit of control in a battery system. However, the battery system may be configured using a device other than the lithium ion battery as long as the device can store and discharge electric charge.

In addition, the battery control device 1 according to the present invention can be used to monitor and control the state of the battery control device 1, and any device may be used without being limited to a single battery cell as long as the use thereof can be limited when the state of charge (SOC) is too high (overcharge) or too low (over-discharge).

The battery control device 1 includes a battery module 10, a plurality of slave devices 101 (hereinafter referred to as a slave 101) that measure each group of a plurality of single batteries 100 constituting the battery module 10, and a master device 200 (hereinafter referred to as a master 200) that communicates with the plurality of slaves 101. Thus, the battery control of the wireless communication is performed in the vehicle on which the battery control device 1 is mounted.

The battery module 10 is configured by connecting a plurality of single battery cells 100 (hereinafter referred to as a cell 100) in series or in series and parallel. In the slave 101, a slave 101*a*, a slave 101*b*, . . . , and a slave 101*n* are installed for each group of a plurality of cells 100, and each measures a state (hereinafter referred to as a cell state) of a target cell group. Note that the cells in the cell group measured by the slave 101*a*, the slave 101*b*, . . . , and the slave 101*n* are referred to as a cell 100*a*, a cell 100*b*, . . . , and a cell 100*n*, respectively.

The functional units of the slave 101 will be described focusing on the slave 101*a*. The slave 101*a* includes a measurement device 111 that measures the states of the plurality of cells 100*a*. The measurement device 111 measures a state such as a voltage and a temperature of the target cell 100*a*.

In addition, the slave 101*a* includes a wireless device 112 and a wireless antenna 116 that have a role of wirelessly transmitting the measured cell state of the cell 100*a* to the master 200. The slave 101*a* communicates with the master 200 using the wireless antenna 116. In addition, a monitoring line 301 is provided between the respective wireless antennas 116 of the slave 101*a* and the slave 101*b*. Thus, the communication state between the slave 101*a* and the master 200 is monitored by the slave 101*b*. (Details will be described later)

Note that the present invention has a configuration in which the slave 101 has a function of monitoring at least one other slave 101 through the monitoring line 301, but for the sake of convenience of description of the drawings, one slave 101 monitors another slave 101 through the monitoring line 301. In the monitoring function on one side between the slaves 101, for example, when the cell voltage monitoring function is lost due to deterioration of the communication state between the slave 101 and the master 200, the monitoring within a certain period of time is maintained.

The slave 101*a* includes a data storage unit 113, an abnormality detection device 114, and a communication trouble counting device 115 in the wireless device 112. The data storage unit 113 has a function of storing information such as the state of the cell 100*a* measured by the slave 101*a*. In addition, in the slave 101*b* monitoring the slave 101*a*, the data storage unit 113 stores not only the cell state of the cell 100*b* measured by the slave 101*b* but also the cell state of the cell 100*a* in which the slave 101*a* communicates with the master 200 via the monitoring line 301.

The abnormality detection device 114 detects the presence or absence of abnormality of the cell 100*a* in the slave 101*a*, and detects the presence or absence of abnormality of the cell 100*b* and also detects communication abnormality of the slave 101*a* in the slave 101*b* monitoring the slave 101*a*. The communication trouble counting device 115 counts the number of communication troubles of the slave 101 to be monitored. For example, the slave 101*b* counts the number of communication troubles of the slave 101*a*.

The abnormality detection device 114 detects not only the presence or absence of an abnormality in the cell state but also a communication error, a single battery cell state, and the like occurring within the assigned communication period of the slave 101 being monitored. A threshold value of the abnormality detection of the abnormality detection device 114 may be a fixed value defined in advance, or may be a value obtained by transmitting a value calculated by the master 200 or the vehicle based on the vehicle situation, the state of the cell 100, or the like to the slave 101. In addition, the result flag of abnormality detection of the cell state at this time may be stored in the data storage unit 113 as a failure diagnosis result of the vehicle. In addition, the result flag of abnormality detection of the cell state at this time may be transmitted to the vehicle side as failure data.

The master 200 includes a wireless device 201 and a wireless antenna 203 that performs wireless communication with the slave 101*a*. In addition, the master 200 includes a cell state monitoring unit 202 that acquires, from the slave 101*a*, the slave 101*b*, . . . , and the slave 101*n*, data regarding the cell states of the respective cells 100*a*, 100*b*, . . . , and 100*n* measured by the respective slaves 101. The master 200 controls the battery module 10 based on the analysis of the data regarding the cell states of the cells 100*a*, 100*b*, . . . 100*n*.

Communication lines 300*a*, 300*b*, . . . 300*n* are wireless communication lines configured between the wireless antennas 116 of the slaves 101*a*, 101*b*, . . . , and 101*n* and the wireless antenna 203 of the master 200. Note that, in FIG. 1, the communication lines 300*a*, 300*b*, . . . 300*n* are n bidirectional lines.

The monitoring line 301 is a unidirectional line that monitors communication contents exchanged in one communication line 300. For example, the monitoring line 301 in FIG. 1 monitors the communication line 300*a* provided between the master 200 and the slave 101*a*. The slave 101*b* monitors the communication line 300*a* via the monitoring line 301.

Although not illustrated in FIG. 1, in addition to the monitoring line 301 between the slave 101*a* and the slave 101*b*, a monitoring line 301 for monitoring each of the communication lines 300 other than the communication line 300*a* is provided between the slaves 101. Note that since n slaves 101 monitor at least one communication line 300, a minimum of n unidirectional lines are formed in the monitoring line 301.

FIG. 2

The slave 101*b* monitors the communication line 300*a* between the master 200 and the slave 101*a* via the monitoring line 301. Here, the communication line 300*a* falls into a state in which the data from the slave 101*a* is not transmitted to the master 200 due to the communication trouble caused by disturbance or the like. In this state, the cell state of the cell 100*a* of the slave 101*a* cannot be transmitted to the master 200.

Here, the slave 101*b* monitoring the communication line 300*a* detects that there is no reply of an ACK signal (Acknowledgement: indicating that the communication is successful with respect to the slave that has transmitted the data) from the master 200 or that a NAK signal (Negative Acknowledgement: indicating that communication has failed) is transmitted. Then, the information on the cell state of the cell 100*a* stored in the data storage unit 113 of the slave 101*b* is proxy transmitted to the master 200 without waiting for the response of the slave 101*a* in communication trouble.

As described above, the slave 101*b* monitoring the slave 101*a* performs proxy communication with the master 200 using the monitoring line 301 and its own communication line 300*b*, so that the monitoring contents of the slave 101*a* can be immediately transmitted to the master 200. In this way, it is possible to respond to returning to the safe state within a certain period of time provided from the viewpoint of responding to functional safety, and it is possible to eliminate the waiting time and realize process reduction.

In addition, when the slave 101*b* can detect not only the communication trouble of the communication line 300*a* but also the occurrence of the communication abnormality, to be described later, for a predetermined number of times by monitoring the slave 101*a* using the monitoring line 301, the slave 101*b* can simultaneously determine whether or not there is a defect in the wireless transmission/reception function of the monitoring slave 101*a*.

For example, when the slave 101*b* monitors the data transmission of the slave 101*a* on the monitoring line 301, the slave 101*b* may detect that the data related to the cell state of the cell 100*a* is not transmitted even if the slave 101*a* receives a command to start the measurement of the cell state from the master 200 due to a timeout or the like. At this time, the slave 101*b* determines that there is a defect in which the slave 101*a* cannot receive the command to start the measurement of the cell state or data related to the cell state of the cell 100 cannot be transmitted, and the slave 101*a* can transmit to the master 200 that there is a wireless transmission/reception functional defect.

The result flag of the wireless transmission/reception functional defect at this time may be stored in the data storage unit 113 as a failure diagnosis result of the vehicle. In addition, the result of the wireless transmission/reception functional defect at this time may be transmitted to the vehicle side as failure data.

FIG. 3

Figure 2:
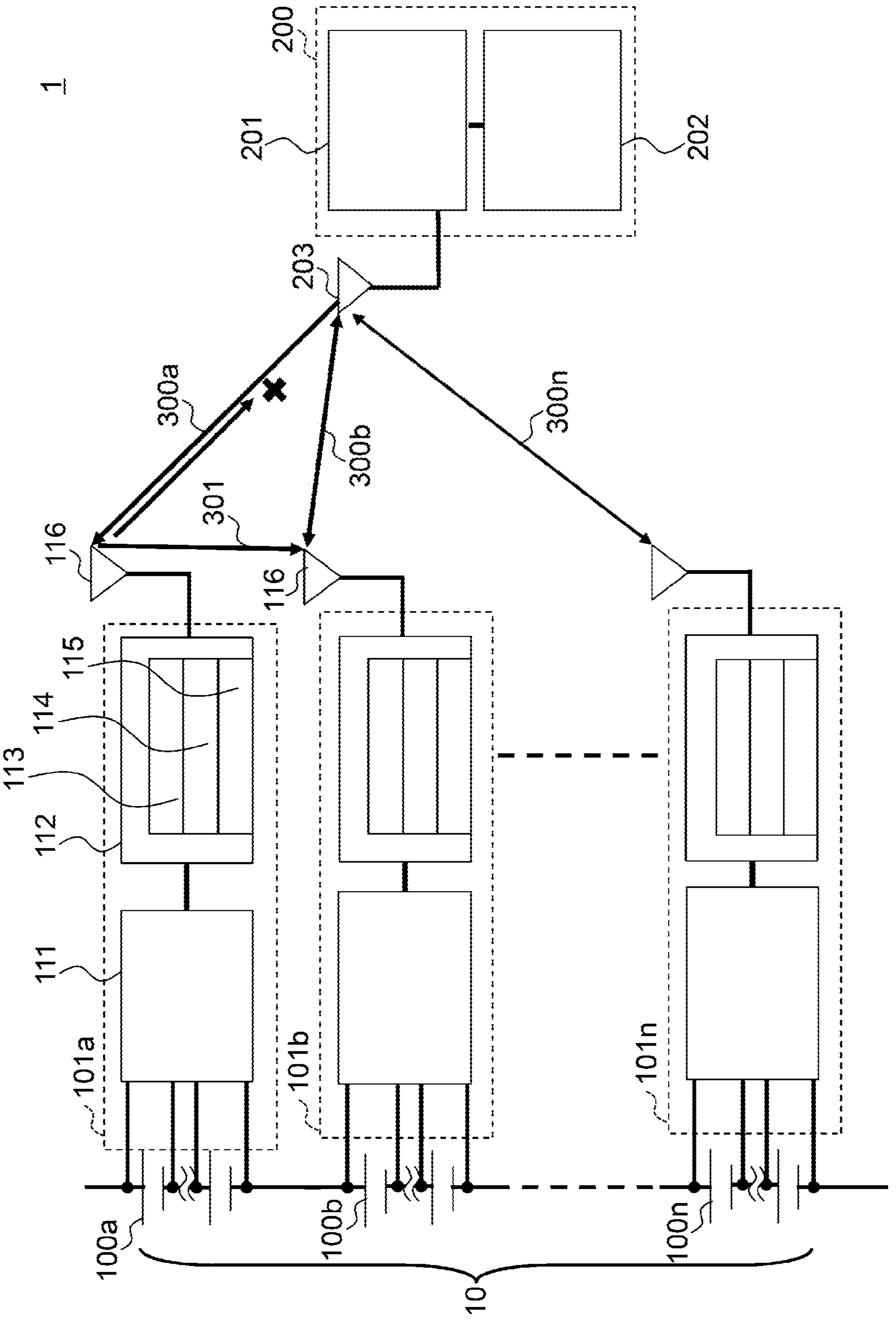
FIG. 2 is a diagram describing proxy communication by a slave device according to one embodiment of the present invention.

A specific communication flow with the master 200 at the time of communication trouble described with reference to FIG. 2 will be described. Note that the horizontal axis is a time axis (communication period). The master 200 transmits a command to start measurement of the cell state of the cell 100 to each of the slaves 101*a*, 101*b*, . . . 101*n* by broadcast communication all at once via the communication lines 300*a*, 300*b*, . . . 300*n* (S100). Note that the broadcast communication refers to transmitting commands all at once from one master 200 to the slave 101.

When receiving a command to start measurement from the master 200, each of the slaves 101*a*, 101*b*, . . . 101*n* measures the cell state of each of the cells 100*a*, 100*b*, . . . 100*n* to measure at the same timing (S101).

Each of the slaves 101*a*, 101*b*, . . . 101*n* measures the cell state of each of the measured cells 100*a*, 100*b* . . . 100*n*, and then transmits the cell state of each of the cells 100*a*, 100*b* . . . 100*n* to the master 200 (S102).

In order to prevent the collision from occurring in the data transmission of each of the slaves 101*a*, 101*b*, . . . 101*n*, a different constant waiting time is provided for each slave from the completion of the measurement of the state of each of the cells 100*a*, 100*b* . . . 100*n* to the data transmission of the cell state to the master 200 with respect to each of the slaves 101*a*, 101*b* . . . 101*n*. As a result, each of the slaves 101*a*, 101*b* . . . 101*n* sequentially transmits data to the master 200.

Note that the constant waiting time at this time may be a fixed value defined in advance, or may be a value obtained by transmitting a value calculated by the master 200 or the vehicle based on the vehicle situation, the cell state of the cell 100, or the like to the slave 101.

The slave 101*b* monitors the communication content of the slave 101*a* using the monitoring line 301 that monitors the communication line 300*a* (S103). Data such as the cell state of the cell 100*a* of the slave device 101*a* monitored and obtained by the slave 101*b* is stored in the data storage unit 113 of at least one of the slave 101*a* and the slave 101*b*.

When the communication line 300*a* becomes the communication trouble 120 due to a factor such as disturbance and the transmission data does not reach the master 200 from the slave 101*a*, the master 200 transmits, to the slave 101*a* that has transmitted the data, NAK indicating that ACK indicating that communication has succeeded cannot be transmitted or that communication has failed to the slave 101*a* (S104).

The slave device 101*b* detects the non-transmission of the ACK or the transmission of the NAK from the master 200 to the slave 101*a* using the monitoring line 301, thereby determining that the transmission data of the slave device 101*a* to be monitored cannot be transmitted to the master 200 (S103).

The monitoring slave 101*b* adds the cell state of the cell 100 of the slave 101*a* to be monitored stored in the storage unit 113 to the cell state data of the cell 100 it has measured, and transmits the cell state data to the master 200 (S105). The master 200 receives the transmission data from the slave 101*b*, performs decoding 121, and returns ACK 122 to the slave 101*b*. Note that, since it is necessary to perform proxy communication by another slave when the slave 101*n* has failed, in the drawing, a period for performing proxy communication of the slave 101*n* is provided before entering the next communication period. As a result, the communication period within the period is completed, and the measurement start command of the cell state is sent again from the master 200 to each of the slaves 101*a*, 101*b*, . . . 101*n*.

In this way, in the method in which the slave 101*b* monitors the communication between the slave 101*a* and the master 200, by using the monitoring line 301, the request process of the data transmission and the proxy communication can be omitted, which has been conventionally performed by the slave 101*a* having the communication trouble from the slave 101*b* to the slave 101*n*. As a result, the securing of the communication waiting time per unit allocated between each slave 101 and the master 200 can be shortened, and the communication period can be set short. As a result, the master 200 can acquire the data related to the cell state of the cell 100 of the slave 101*a* having communication trouble without delay within the same communication period.

Note that when communication trouble and abnormality of the cell 100*n* occur in the slave 101*n*, the slave 101*a* may monitor the communication line 300*n* between the slave 101*n* and the master 200 through the monitoring line 301 in order not to lose the simultaneity of the communication.

FIG. 4

Figure 3:
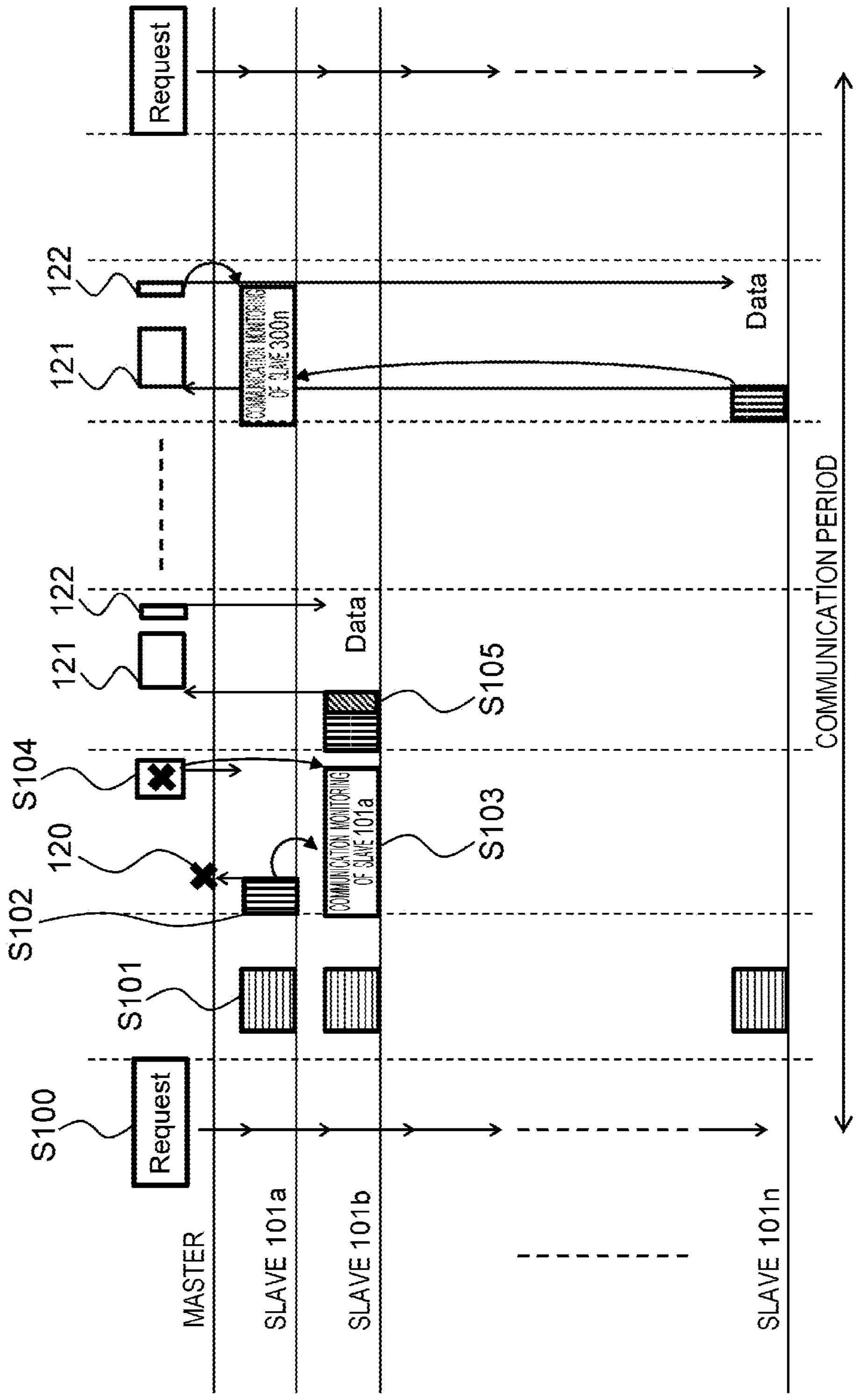
FIG. 3 is an example illustrating communication trouble and communication timing of communication monitoring of the slave device according to one embodiment of the present invention.
Figure 4:
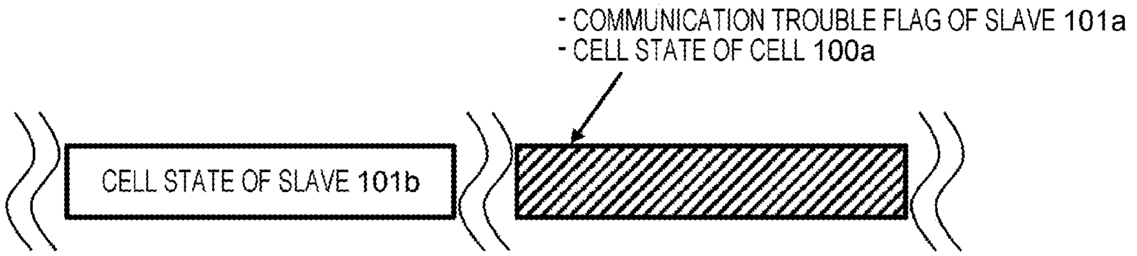
FIG. 4 is an example illustrating data at the time of alternative communication of the slave device.

The amount of data at the time of proxy communication will be described. When executing the proxy communication with respect to the master 200 described in FIG. 3 (S105), the slave 101*b* transmits the result flag of the communication trouble of the monitored slave 101*a*, the data related to the cell state of the cell 100*a* measured by the slave 101*a*, and the like in addition to the data related to the cell state of the cell 100*b* of the slave 101*b*. Note that the result flag of the communication trouble may be stored in the data storage unit 113 as a failure diagnosis result of the vehicle. In addition, the result flag of the communication trouble at this time may be transmitted to the vehicle side as failure data.

Thus, the slave 101*b* monitoring the slave 101*a* not only transmits the state and the like of the cell 100*b* to the master 200, but also transmits information on the cell state of the cell 100*a* measured by the slave 101*a* to the master 200. However, in this state, the data amount that is twice the data amount of the slave 101*a* and the slave 101*b* is transmitted to the master 200, and thus there is a possibility that the master 200 cannot acquire information within the time limit.

FIG. 5

Therefore, using the provided abnormality detection device 114, the slave 101*b* compresses the data related to the cell state of the cell 100*a* measured by the slave 101*a* to only the abnormality detection flag (determination of whether abnormal) indicating only the presence or absence of abnormality to obtain at least 1 bit of data. Then, the slave 101*b* transmits the communication trouble flag of the slave 101*a* and the compressed cell state abnormality flag of the cell 100*a* to the master 200 together with the cell state data of the cell 100*b* measured by the slave 101*b*. In this way, the slave 101*b* can minimize the data length at the time of the proxy communication and transmit the data to the master 200 in a state in which the abnormality detection of the cell 100*a* is known at the minimum, and it is possible to reduce the communication load due to the increase in the transmission data amount and the decoding time at the time of the proxy communication.

In addition, it is possible to handle a case where a communication period in a short time is required for estimating an abnormality leading to an overvoltage and an over-discharge of the cell 100*a*. Furthermore, the suppression of the increase in decoding time per slave 101 is effective for all the slaves 101 (n) wirelessly communicating with the master 200, and can respond to the communication period in a short time described above.

In addition, after detecting the abnormality flag of the cell 100*a* in the first communication period, the master 200 may receive details of the voltage and temperature of the cell 100*a* in the next communication period. In this way, it is possible to respond without losing the simultaneity of communication.

FIG. 6

Next, proxy communication when a predetermined number of communication troubles occur in the same monitoring slave device 101 will be described. When the communication trouble of the slave 101*a* occurs, the slave 101*b* compresses only the abnormality flag of the cell 100*a* and transmits the compressed abnormality flag to the master 200 as described above so as not to lose the simultaneity of the abnormality detection in the proxy communication, but when the communication trouble of the slave 101*a* occurs many times, there is a possibility that there is a big problem in the cell state of the cell 100*a*.

Figure 5:
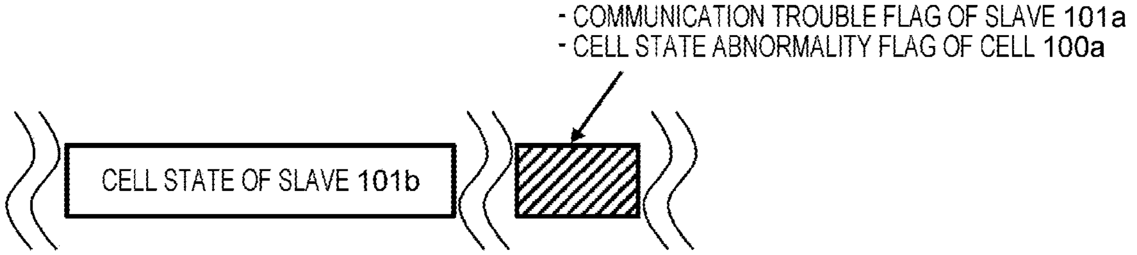
FIG. 5 is an example illustrating data obtained by information-compressing data at the time of alternative communication by the slave device according to one embodiment of the present invention.
Figure 6:
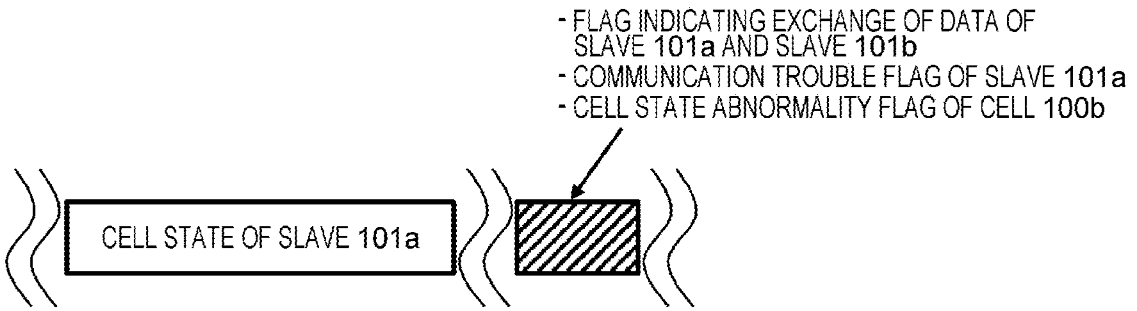
FIG. 6 is an example illustrating data at the time of alternative communication in a case where a communication error of the same slave device occurs a predetermined number of times, which is a modified example of the present invention.

For example, in order to grasp the abnormality of the cell 100*a*, it is necessary for the master 200 to grasp the upper and lower transitions of the cell voltage and the upper and lower transitions of the cell temperature at an early stage. However, in the mode of FIG. 5 described above, the master 200 cannot grasp the details of the cell 100*a*.

Therefore, the slave 101*b* counts the number of communication troubles of the slave 101*a*, and when the number of communication troubles reaches a predetermined number of times, first transmits the data exchange flag of the slave 101*a* and the slave 101*b*, the data on the cell state of the cell 100*a* measured by the slave 101*a*, the communication trouble flag of the slave 101*a* similar to the above, and the cell state abnormality flag of the cell 100*b* measured by the slave 101*b* to the master 200. In this way, the master 200 determines the presence or absence of abnormality using only the abnormality detection flag for the cell 100*b* having a low abnormality level that had no problem so far, and can grasp the cell state (all the data of the slave 101*a*) of the cell 100*a* for which details are necessary.

That is, the abnormality detection device 114 of the slave 101*b* determines the abnormality related to the communication trouble of the slave 101*a* for the abnormality detection in which the number of communication troubles is less than the predetermined number of times, and determines the abnormality related to the cell state of the cell 100*a* measured by the slave 101*a* if the number of communication troubles is greater than or equal to the predetermined number of times.

The number of communication troubles at this time may be stored in the data storage unit 113 as a failure diagnosis result of the vehicle. The predetermined number of times at this time may be a fixed value defined in advance, or may be a value obtained by transmitting a value calculated by the master 200 or the vehicle based on the vehicle situation, the state of the single battery cell 100, or the like to the slave 101. The predetermined number of communication troubles at this time may be transmitted as failure data to the vehicle side.

In this way, the master 200 can regularly acquire not only the abnormality detection flag related to the cell state of the cell 100*a* measured by the slave 101*a* but also the detailed data related to the cell state of the cell 100*a* for the slave 101*a* in which the predetermined number of communication troubles have occurred. As a result, even when a communication trouble occurs in the slave 101*a*, the master 200 can monitor state transition leading to overvoltage and over-discharge of the cell 100*a*. Similarly to FIG. 5, since the data length at the time of the proxy communication is minimized by the data compression, the communication load due to the increase in the transmission data amount and the decoding time can be reduced, and the communication period between the master 200 and each slave 101 can be set to be short by minimizing the increase in the communication waiting time per slave unit.

FIG. 7

Figure 7:
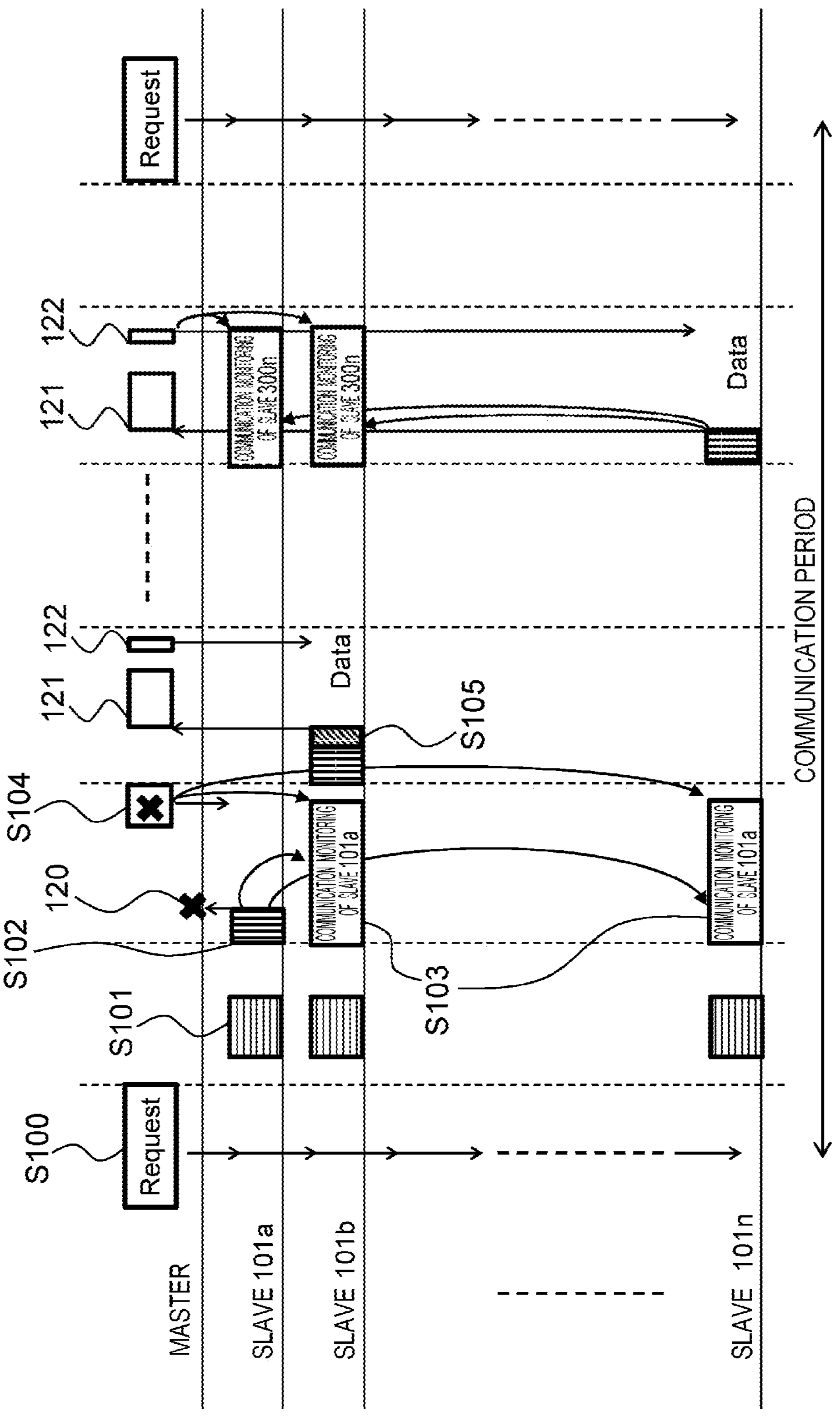
FIG. 7 is a diagram illustrating an example of a communication timing at which one slave device monitors communication for all the other slave devices.
Figure 8:
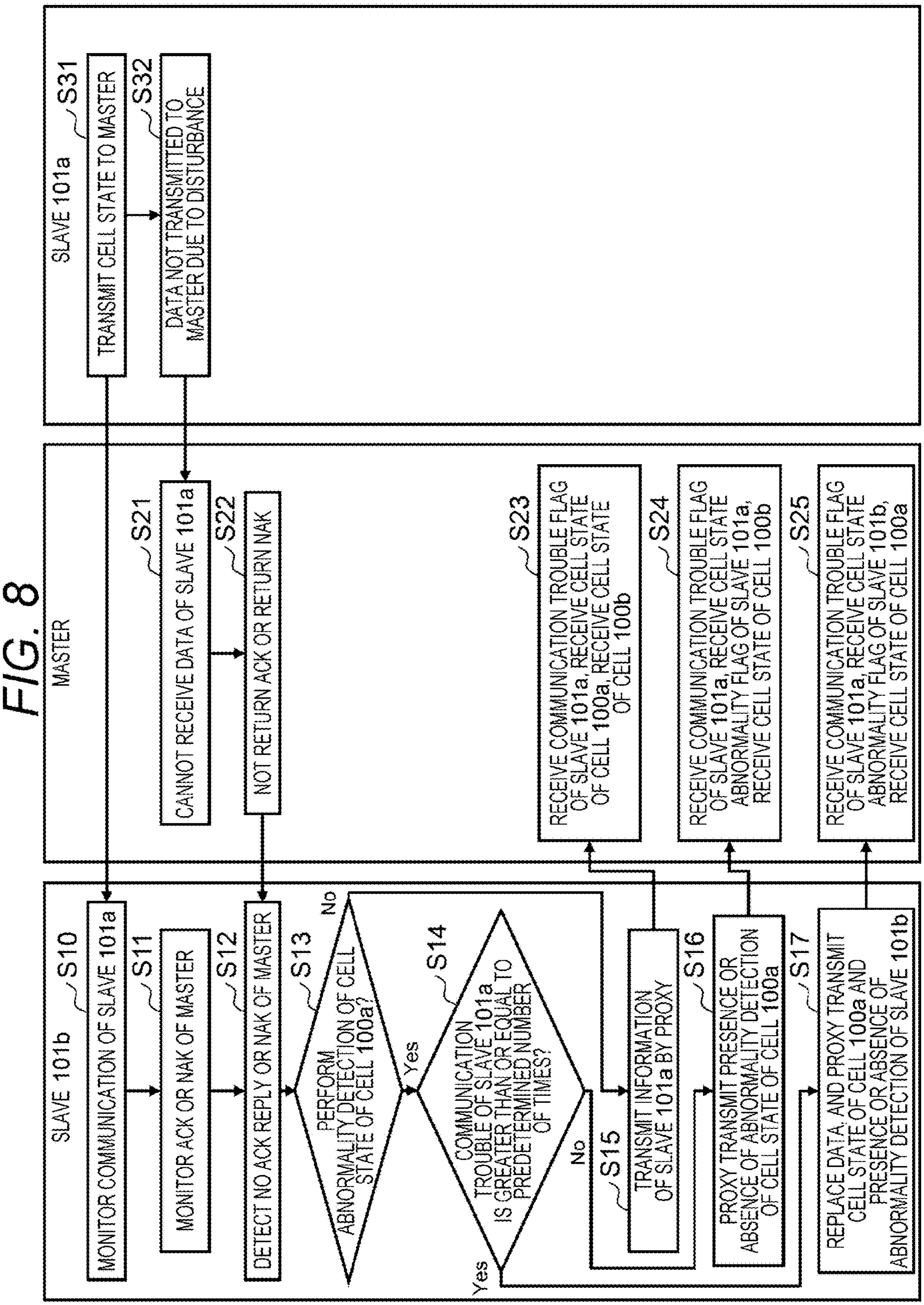
FIG. 8 is a flowchart of proxy communication according to one embodiment of the present invention.

Although the slave 101 described above is an example of monitoring at least one other slave 101, FIG. 7 illustrates an example in which one slave 101 is monitored by all the other slaves 101.

The slave 101*a* is monitored from n−1 slaves 101 from slave 101*b* to slave device 101*n*. At this time, in the monitoring line 301, the n slaves 101 monitor the n−1 communication lines 300 other than the own communication, and thus n×(n−1) unidirectional monitoring lines 301 are formed at the maximum. That is, n−1 monitoring lines 301 monitor one communication line 300*a*.

In this way, even if some of the monitoring slaves 101 cannot be monitored due to communication trouble by communication trouble caused by disturbance, if any one slave 101 can monitor the communication by prioritizing the monitoring, proxy communication can be performed with respect to the master 200. For example, even when there is a problem with the slave 101*b* monitoring the slave 101*a*, the slave 101*c* having the second priority has a role of making a backup so that monitoring of the slave 101*a* can be continued. As a result, the quality of the monitoring line 301 is improved, and the battery control device 1 can have a redundant function.

Note that the number of monitoring lines 301 may be a fixed value defined in advance, or may be a value obtained by transmitting a value calculated by the master 200 or the vehicle based on a vehicle situation, a cell state of the cell 100, or the like to the slave 101.

FIG. 8

A flowchart of the communication timing and the transmission of the proxy communication data in FIGS. 3 to 6 will be described. Similarly to the description above, in the flowchart, the slave 101*b* monitoring the master 200, the slave 101*a* communicating with the master 200, and the communication line 300*a* by the monitoring line 301 will be described as an example.

The slave 101*a* transmits data related to the cell state of the cell 100 to the master 200 (S31). At this time, the slave 101*b* monitors this communication (S10). Furthermore, the slave 101*b* monitors ACK or NAK of the master 200 (S11). Here, when the data of the slave 101*a* is not transmitted to the master 200 due to disturbance or the like (S32), the master 200 detects that the data cannot be received due to timeout or the like (S21). In response to this, the master 200 does not return ACK or returns NAK to the slave 101*b* (S22). The slave 101*b* detects no ACK reply or NAK reply from the master 200 (S12).

The slave 101*b* detects the communication trouble of the slave 101*a* through the monitoring line 301, and proxy transmits the cell state of the cell 100*a* measured by the monitored slave 101*a* to the master 200. Whether the abnormality detection of the cell state of the cell 100*a* measured by the slave 101*a* is performed is determined by the preset function (S13). In a case where the abnormality detection of the cell state is not performed (S13: No), the slave 101*b* proxy transmits the information of the slave 101*a* to the master 200 as described in FIG. 4 (S15). The master 200 receives the cell state of the cell 100*b* measured by the slave 101*b* itself, the communication trouble flag of the slave 101*a*, and the cell state of the cell 100*a* measured by the slave 101*a* (S23).

In a case where the abnormality detection of the cell state is performed (S13: Yes), whether the communication trouble of the slave 101*a* is greater than or equal to a predetermined number of times is determined (S14). When the communication trouble of the slave 101*a* is less than the predetermined number of times, the slave 101*b* proxy transmits the presence or absence of abnormality detection of the cell state of the cell 100*a* to the master 200 (S16). The master 200 receives the abnormality detection flag detected by the abnormality detection device 114 for the cell state of the cell 100*b* measured by the slave 101*b* itself, the communication trouble flag of the slave 101*a*, and the cell state of the cell 100*a* measured by the slave 101*a* (S24).

When the communication trouble of the slave 101*a* is greater than or equal to the predetermined number of times (S14: Yes), as described with reference to FIG. 6, the slave 101*b* replaces the data, and proxy transmits the cell state of the cell 100*a* and the presence or absence of abnormality detection of the slave 101*b* to the master 200 (S17). The master 200 receives the abnormality detection flag obtained by detecting the cell state of the cell 100*b* measured by the slave 101*b* by the abnormality detection device 114, the communication trouble flag of the slave 101*a*, and the cell state of the cell 100*a* measured by the slave 101*a* (S25).

Although the slave 101*b* monitors the slave 101*a*, if the state of the slave 101*a* is transmitted as it is as a proxy, there is a possibility that it may not fall within the communication period. Therefore, when the communication trouble is less than the predetermined number of times, it is determined as a light abnormality, and the cell state detected by the slave 101*b* and a flag (small capacity) as to whether or not it is the abnormality of the slave 101*a* being monitored are sent to the master 200.

In this way, the master 200 can grasp the state of each slave 101 according to the predetermined number of times, and the cell 100 can be reliably monitored in a short communication period.

According to one embodiment of the present invention described above, the following operation effects are obtained.

(1) The battery control device 1 includes a master device 200 that monitors the states of a plurality of battery cell groups provided in the vehicle, and a plurality of slave devices 101 that are installed for each battery cell group, detect the state of each battery cell group, and transmit the state of the battery cell group to the master device 200. The master device 200 and the plurality of slave devices 101 communicate sequentially in a time division manner, and the slave device 101 includes an abnormality detection unit 114 that detects an abnormality in communication by monitoring communication between another slave device 101 and the master device 200. When the abnormality detection unit 114 detects the abnormality of the communication, information of another slave device 101 is transmitted to the master device 200 together with the information of the slave device 101. Therefore, the battery control device 1 capable of securing simultaneity of proxy transmission under a communication trouble can be provided.

(2) When the communication abnormality occurs in the other slave device 101 a predetermined number of times, the slave device 101 transmits, to the master device 200, information related to the communication abnormality of the other slave device 101 and information on the presence or absence of the abnormality of the state of the battery cell group to be detected by the other slave device 101. In this way, the master 200 determines the presence or absence of abnormality using only the abnormality detection flag for the battery cell 100 of the battery group having a low abnormality level that had no problem so far, and can grasp the cell state of the battery cell 100 for which details are necessary.

(3) When communication abnormality occurs a predetermined number of times in the other slave device 101, the slave device 101 transmits to the vehicle the fact that the other slave device cannot communicate. With this configuration, it is possible to transmit that there is a wireless transmission/reception functional defect of the monitoring slave device 101.

(4) The slave device 101 transmits information on the communication abnormality of another slave device 101 to the vehicle. In this way, information such as the communication situation of the other slave device 101 being monitored and the wireless transmission/reception functional defect can be transmitted to other mounted devices of the vehicle.

(5) The slave device 101 includes a storage unit 113 that stores state information of the other slave device 101. With this configuration, the slave device 101 can grasp not only the cell state of the cell 100 measured by the slave device 101 but also the cell state of the cell 100 measured by the other slave device 101 from the communication with the master 200 of the other monitoring slave device 101.

Note that the present invention is not limited to a battery system used in a hybrid electric vehicle (HEV), and can be widely applied to a battery system used in other vehicles, for example, a plug-in hybrid electric vehicle (PHEV), a battery electric vehicle (BEV), a railway vehicle, and the like, and various power storage devices used in applications other than the battery system of the vehicle.

Furthermore, the present invention is not limited to the above embodiments, and various modifications and other configurations can be combined within a scope not deviating from the gist of the present invention. In addition, the present invention is not limited to one including all the configurations described in the above embodiment, and includes one in which a part of the configuration is deleted.

REFERENCE SIGNS LIST

1 battery control device
10 battery module
100 single battery cell
101 slave device
111 state measuring device of single battery cell
112 wireless device
113 data storage unit
114 abnormality detection device
115 communication trouble counting device
116 wireless antenna
120 communication trouble (due to disturbance etc.)
121 receive data from slave device (decode)
122 ACK (ACKnowledgement: acknowledgment)
200 master device
201 wireless device (master side)
202 cell state monitoring unit
203 wireless antenna (master side)
300 communication line
301 monitoring line

The invention claimed is:

1. A battery control device comprising:

a master device that monitors states of a plurality of battery cell groups provided in a vehicle; and a plurality of slave devices installed for each battery cell group, and configured to detect a state of each battery cell group and transmit the states of the battery cell groups to the master device, wherein the master device and the plurality of slave devices sequentially communicate in a time-division manner, wherein a first slave device includes an abnormality detection unit device that detects an abnormality in communication by monitoring communication between a second slave device and the master device, and when the abnormality detection device detects the abnormality in the communication, the first slave device transmits information on the second slave device to the master device together with information on the first slave device, wherein the first slave device is electrically coupled to the second slave device via a monitoring line configured to deliver, to the first slave device, a wireless communication between the second slave device and the master device, wherein the monitoring comprises detecting whether the master device has transmitted an acknowledgment or a negative acknowledgment corresponding to a transmission from the second slave device, and wherein, responsive to detection of the abnormality, the first slave device transmits, within the same communication period in which the abnormality is detected, proxy information corresponding to the state detected for the second slave device.

2. The battery control device according to claim 1, wherein when the abnormality of the communication occurs in the second slave device a predetermined number of times, the first slave device transmits, to the master device, information on the abnormality of the communication of the second slave device and information on presence or absence of the abnormality of the state of the battery cell group to be detected by the second slave device.

3. The battery control device according to claim 1, wherein when the abnormality of the communication occurs in the second slave device a predetermined number of times, the first slave device notifies the vehicle that the second slave device is unable to communicate.

4. The battery control device according to claim 1, wherein the first slave device transmits, to the vehicle, information on an abnormality of the communication of the second slave device.

5. The battery control device according to claim 1, wherein the first slave device includes a storage unit that stores state information of the second slave device.

6. The battery control device according to claim 1, wherein the monitoring line is a unidirectional line configured to deliver, to the first slave device, communication contents exchanged on a communication line between the master device and the second slave device.

7. The battery control device according to claim 1, wherein the abnormality detection device detects the abnormality in the communication based on whether the master device transmits an acknowledgment (ACK) or a negative acknowledgment (NAK) corresponding to a transmission from the second slave device.

8. The battery control device according to claim 1, wherein the proxy information includes an abnormality detection flag indicating presence or absence of abnormality of a state of the battery cell group of the second slave device, the abnormality detection flag comprising at least one bit.

9. The battery control device according to claim 8, wherein after receiving the abnormality detection flag indicating the presence of abnormality, the master device receives details of voltage and temperature of the battery cell group of the second slave device in a next communication period.

10. The battery control device according to claim 1, wherein a plurality of slave devices are configured to monitor communication between the second slave device and the master device, and proxy information corresponding to the second slave device is transmitted according to a priority among the plurality of slave devices.

* * * * *